United States Patent
Balakrishnan et al.

(10) Patent No.: US 9,588,566 B2
(45) Date of Patent: Mar. 7, 2017

(54) PROGRAMMABLE TIME DELAY AND SIGNAL POLARITY IMPROVING TRANSCEIVER SIGNAL-TO-NOISE METRIC

(75) Inventors: Jaiganesh Balakrishnan, Karnataka (IN); Sriram Murali, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 1193 days.

(21) Appl. No.: 13/226,503

(22) Filed: Sep. 7, 2011

(65) Prior Publication Data
US 2013/0058490 A1  Mar. 7, 2013

(51) Int. Cl.
*H04B 15/00* (2006.01)
*G06F 1/30* (2006.01)
*H04H 40/72* (2008.01)

(52) U.S. Cl.
CPC .............. *G06F 1/30* (2013.01); *H04H 40/72* (2013.01)

(58) Field of Classification Search
CPC .... H04B 1/0475; H04B 15/00; G10L 21/0208
USPC ......... 455/114.2, 114.3, 127.2; 381/13, 94.1, 381/94.6, 94.7, 94.8, 94.9
See application file for complete search history.

(56) References Cited

U.S. PATENT DOCUMENTS

| | | | |
|---|---|---|---|
| 7,551,743 B1* | 6/2009 | Tsujishita | G11B 20/24 381/2 |
| 2004/0207548 A1* | 10/2004 | Kilbank | H03M 7/30 341/107 |
| 2006/0061684 A1* | 3/2006 | Easley et al. | 348/485 |
| 2006/0182204 A1* | 8/2006 | Cairns et al. | 375/340 |
| 2007/0120721 A1* | 5/2007 | Caduff | H03G 3/3026 341/155 |

* cited by examiner

*Primary Examiner* — Alexander Jamal
(74) *Attorney, Agent, or Firm* — Lawrence J. Bassuk; Charles A. Brill; Frank D. Cimino

(57) ABSTRACT

Suppression of interference across transceivers integrated on a single semiconductor chip. An example of a method of reducing noise in a transceiver includes introducing an adjustable time delay into a signal between a first section of a signal path into which noise may be introduced and a second section of the signal path into which noise may be introduced. The method also includes selectively adjusting the time delay and signal polarity to improve a signal-to-noise metric of the transceiver. An example of the transceiver includes a transmitter and a receiver. The transceiver also includes an adjustable time delay between a first section of a transceiver signal path into which noise may be introduced and a second section of the transceiver signal path into which noise may be introduced and circuitry for reducing noise by adjusting a value of the time delay.

5 Claims, 3 Drawing Sheets

PROGRAMMABLE TIME DELAY AND SIGNAL POLARITY IMPROVING TRANSCEIVER SIGNAL-TO-NOISE METRIC

TECHNICAL FIELD

In general, embodiments of the disclosure relate to the communication transceivers. More particularly, the disclosure relates to suppression of interference across transceivers integrated on a single semiconductor chip.

BACKGROUND

Consider a system-on-chip (SoC) that supports multiple wireless standards such as Bluetooth (BT), wireless local-area network (WLAN), FM radio, GPS, etc. One or more of these wireless standards typically switch between an active and an idle mode. The periodic movement between active and idle modes could happen hundreds of time a second, and every such switch between active and idle mode (and vice-versa) causes a change in the current draw from the SoC power supply. Consequently, the power supply voltage, nominally constant, experiences a low-amplitude fluctuation at the frequency of the active-to-idle and idle-to-active switching activity.

The periodic fluctuation of the power supply to a multi-standard SoC sends a ripple through the on-chip electronics, and manifests itself as an audible and undesirable buzz in FM radio. The conventional and obvious method to treat this undesirable situation is to electrically isolate the different parts of the chip serving the different wireless standards. However, such techniques increase chip area, complexity, cost and power consumption.

Hence, it is desirable to have suppression of interference (noise) across transceivers integrated on a semiconductor chip.

SUMMARY

An example of a method of reducing noise in a transceiver includes introducing an adjustable time delay into a signal between a first section of a signal path into which noise may be introduced and a second section of the signal path into which noise may be introduced. The method also includes selectively adjusting the time delay and signal polarity to improve a signal-to-noise metric of the transceiver.

An example of a transceiver includes a transmitter and a receiver. The transceiver also includes an adjustable time delay between a first section of a transceiver signal path into which noise may be introduced and a second section of the transceiver signal path into which noise may be introduced and circuitry for reducing noise by adjusting a value of the time delay.

An example of a transceiver includes a transmitter having a transmitter signal path with a first section into which noise may be introduced and a second section into which noise may be introduced. A programmable transmitter time delay circuit is included between the first and second sections of the transmitter signal path. A programmable transmitter signal polarity reversing circuit is included between the first and second sections of the transmitter signal path. The transceiver also includes a receiver having a receiver signal path with a first section into which noise may be introduced and a second section into which noise may be introduced. A programmable receiver time delay circuit is included between the first and second sections of the receiver signal path. A programmable receiver signal polarity circuit is included between the first and second sections of the receiver signal path. A programmable audio gain control is included between the first and second sections of the receiver signal path and a programmable audio volume control is included between the first and second sections of the receiver signal path.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Various embodiments discussed in this disclosure pertain to reducing noise in transmitters or in receivers. The embodiments in this disclosure may apply to stand-alone transmitters and stand-alone receivers as well as to transceivers, that is, a unit wherein transmitter and receiver are combined and share a common circuitry or a single housing.

Figure 1:
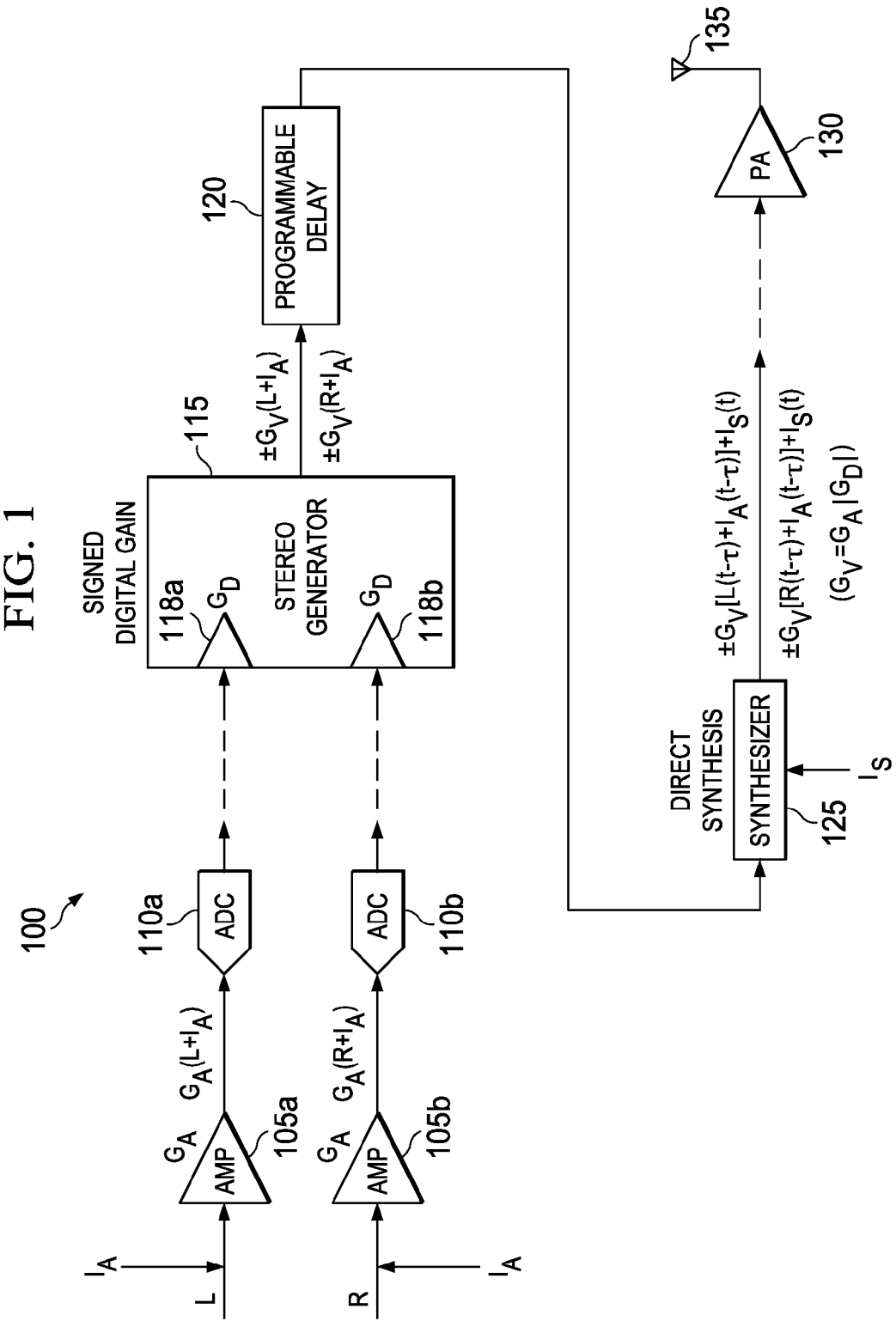
FIG. 1 is a block diagram of a transmitter, in accordance with one embodiment.

FIG. 1 is a block diagram of a transmitter 100 which in one embodiment may be part of a transceiver. The transmitter 100 includes a plurality of gain amplifiers, for example a gain amplifier 105a and a gain amplifier 105b. The gain amplifier 105a receives an input signal in a first channel and the gain amplifier 105b receives another input signal in a second channel. The two channels may represent the left and right constituents of a stereo signal. In an embodiment, the input signals in the first and the second channel are digital signals and are sourced live from a recording studio or a stored medium. Examples of the stored medium include tapes. A noise signal $I_A$ may be introduced at various points along the transmit chain. In an embodiment, the noise $I_A$ can be modeled as being injected at the inputs of the gain amplifier 105a and the gain amplifier 105b. The noise $I_A$ can arise due to fluctuations in the power supply or due to a parasitic coupling with noisy sources, such coupling being radiative or via the ground plane. The input signal and the noise signal $I_A$ on the first channel and the second channel are amplified with gain of the gain amplifier 105a and the gain amplifier 105b.

The transmitter 100 also includes an analog to digital converter (ADC) 110a coupled to the gain amplifier 105a and an ADC 110b coupled to the gain amplifier 105b to convert the input signal in respective channels to digital signals. Examples of the ADC 110a or the ADC 110b include a ramp-compare ADC, integrating ADC, successive-approximation ADC and delta-encoded ADC.

Further, the transmitter 100 includes a stereo generator 115 coupled to receive the digital signals from the ADC 110a and the ADC 110b respectively. The stereo generator 115 can include gain amplifiers (118a and 118b) to amplify the digital signals with a gain $G_D$. The stereo generator 115 combines both the digital signals received into a single composite stereo signal. In some embodiments, both the digital signals are fed into a summing and differential amp to get a combination and difference of the digital signals respectively, and the combined and difference signals are then mixed to obtain the single composite stereo signal. In some embodiments, one or more units can be coupled between the ADC 110a, the ADC 110b, and the stereo generator 115 such as filters, amplifiers, source encoders or error-control encoders.

A programmable delay 120 is coupled to the stereo generator 115b to output a time delayed composite stereo signal. The programmable delay 120 selectively adjusts time delay in order to optimize one or more performance criteria. The one or more performance criteria may be signal-to-noise ratio or spur-free dynamic range.

Further, the transmitter 100 includes a synthesizer 125 that receives the time delayed composite stereo signal. The synthesizer 125 may be a local oscillator that gets modulated by the time delayed composite stereo signal resulting in a radio frequency signal suitable for over-the-air transmission. A noise signal ($I_s$) is introduced in the instantaneous output frequency of the synthesizer. The noise signal $I_S$ may arise due to fluctuations in the power supply of the transmitter 100, or it may have other origins, such as coupling either radiatively or via ground plane to noise sources. The frequency of the fluctuations is related to the duty cycles of the wireless standards supported by a chip including the transceiver and is typically in the hundreds of Hertz, that is, in the audible range. A power amplifier 130 is coupled to the synthesizer to convert a received signal into a signal of power large enough to reach a distant receiver. The power amplifier 130 is optimized to have high efficiency, high output power compression, good return loss on the input and output, good gain, and optimum heat dissipation. Further, the transmitter 100 also includes an antenna 135 coupled to the power amplifier 130 for transmitting the signal.

In an embodiment, the transmitter 100 receives an input signal (L) in a first channel and an input signal (R) in a second channel. The input signal (L) is received by the gain amplifier 105a in the first channel and input signal (R) is received by the gain amplifier 105b in the second channel. In an embodiment, the noise $I_A$ can be modeled as being injected at the input of the gain amplifier 105a and the gain amplifier 105b. The noise signal $I_A$ may arise due to fluctuations in the power supply or due to radiative coupling or ground-plane coupling with a noise source. The input signals (L&R) and the noise signal $I_A$ on the first channel and the second channel are amplified with gain ($G_A$) of the gain amplifier 105a and the gain amplifier 105b respectively. Signal at the output of the gain amplifier 105a is represented as $[G_A(L+I_A)]$ and signal at the output of the gain amplifier 105b is represented as $[G_A(R+I_A)]$. Further, the signals at the output of the gain amplifiers (105a and 105b) are converted to digital signals using the ADC 110a and ADC 110b respectively. The digital signals across the two channels are then fed to the stereo generator 115.

The gain amplifiers (118a and 118b) within the stereo generator 115 amplify the digital signals with the gain $G_D$. $G_D$ is a multiplicative combination of a positive gain, $|G_D|$, and of a polarity, i.e., sign, of $G_D$. Further, the stereo generator 115 combines the digital signals across the two channels into the single composite stereo signal. In frequency modulation (FM), the composite stereo signal could be in the form of a Frequency Multiplex, or MPX signal, consisting of mono (L+R) and stereo (L−R) audio components, a pilot, and a Radio Data System (RDS) signal component. However, these specific signal components can be abstracted out and the composite stereo signal at the output of the stereo generator 115 can be represented as having an effective L-channel component given by $[\pm G_V(L+I_A)]$ and an effective R-channel component given by $[\pm G_V(R+I_A)]$, where $(G_V=G_A|G_D|)$ is the overall volume of the stereo signal.

Figure 3:
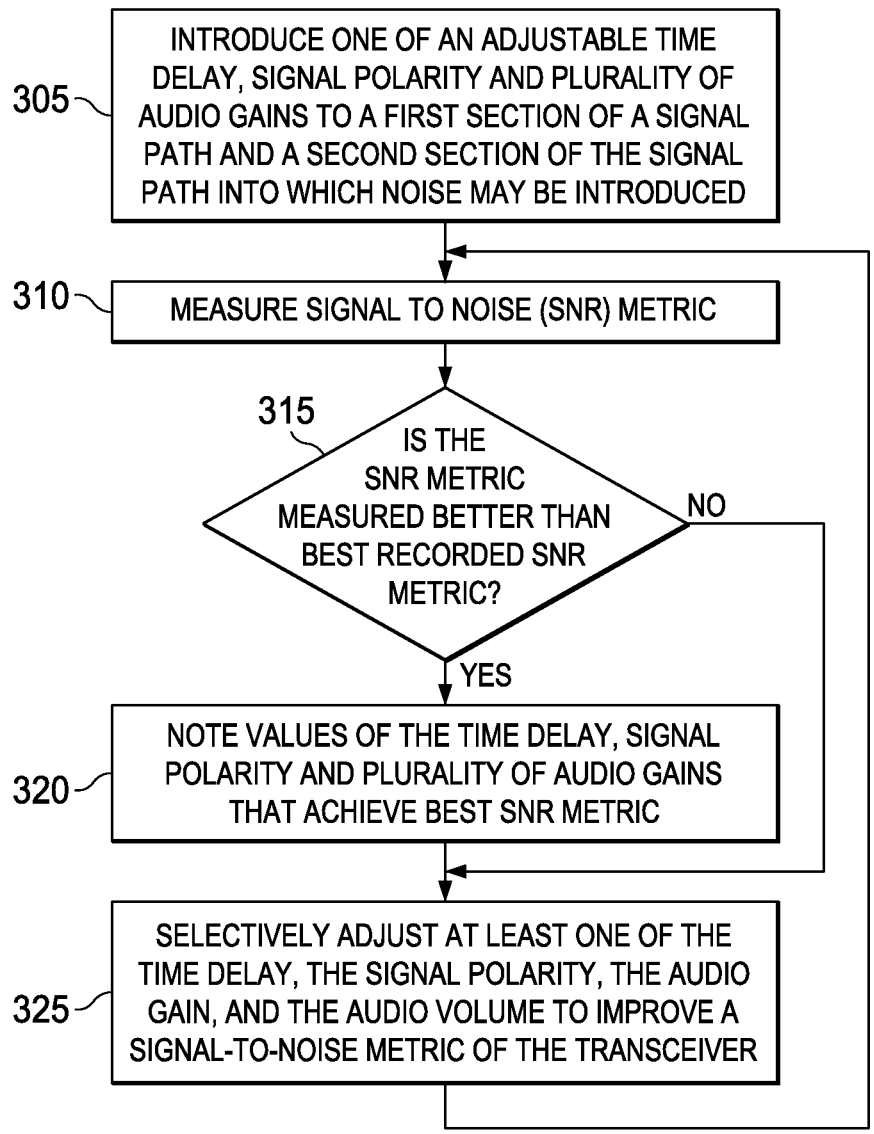
FIG. 3 is a flow-chart illustrating a method for reducing noise in a transceiver, in accordance with which various embodiments are implemented.

The composite stereo signal derived from the stereo generator 115 is then fed to the programmable delay 120. Initially, the time delay ($\tau$) is set to a predetermined minimum value. The parameters $\tau$ has incremental values that are partly a design choice and partly determined by the dimensions of the transmitter 100. Signal polarity of the L and R components of the composite stereo signal is set to a first value and a signal-to-noise metric of the transmitter is measured. Examples of the signal-to-noise metric include, but are not limited to one of, signal-to-noise ratio (SNR) or spur-free dynamic range (SFDR). The time delay and the signal polarity are modified till the signal-to-noise metric is maximized. Upon obtaining the desired signal-to-noise metric, best values of the parameters (time delay and the signal polarity) are set. The modified time delay is set by the programmable delay 120. The composite stereo signal is then time delayed using the programmable delay 120 with modified time delay and fed to the synthesizer 125. Steps for adjusting the time delay and the signal polarity is illustrated in FIG. 3.

At the synthesizer 125, the noise signal L is mixed with the time delayed stereo composite signal. The output of the synthesizer 125 is a frequency modulated signal, which, when demodulated using an FM receiver, will yield a composite stereo signal whose R-channel and L-channel audio components, $L_R(t)$ and $L_L(t)$, can be represented as follows:

$$L_R(t)=G_V R(t-\tau)+\{I_s(t) \pm G_V I_A(t-\tau)\} \quad (1)$$

$$L_L(t)=G_V L(t-\tau)+\{I_s(t) \pm G_V I_A(t-\tau)\} \quad (2)$$

where, $(G_V=G_A|G_D|)$.

The signal at the output of the synthesizer 125 is fed to the power amplifier 130 to convert the received signal into a larger signal of significant power so as to drive the antenna 135 of the transmitter 100.

By modifying the time delay ($\tau$) and the signal polarity, the noise component $\{I_s(t) \pm G_V I_A(t-\tau)\}$, present in equations (1) and (2), is minimized, thus improving the quality of the signal generated by the transmitter 100.

Figure 2:
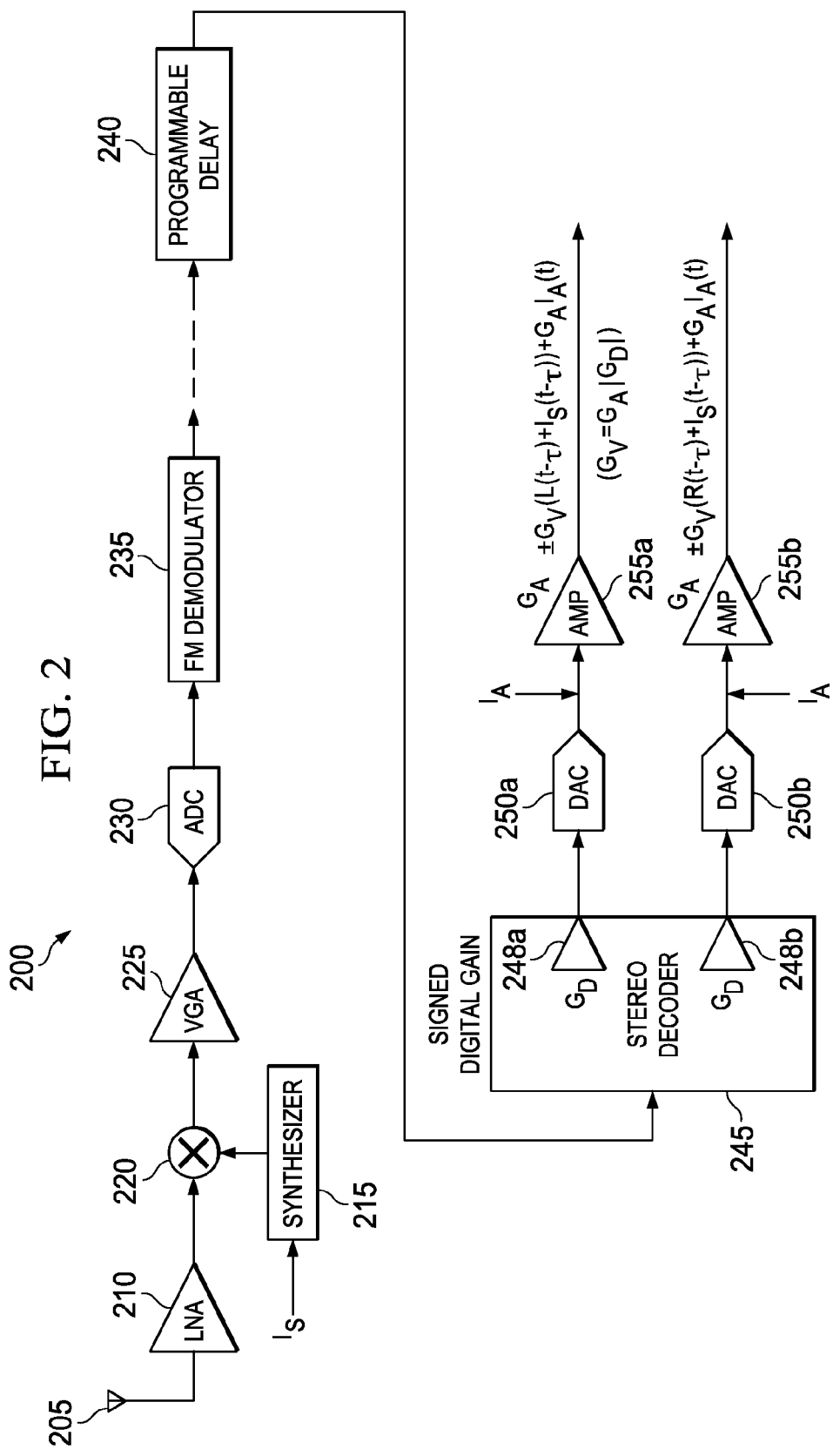
FIG. 2 is a block diagram of a receiver, in accordance with one embodiment.

FIG. 2 is a block diagram of a receiver 200 which in one embodiment may be part of a transceiver. The receiver 200 includes an antenna 205 for receiving a message signal. In an embodiment, the message signal is an audio signal being received by a FM receiver. The receiver also includes a low noise amplifier (LNA) 210 to amplify received signal. Using the LNA 210, the received signal is enhanced in amplitude while minimizing enhancement of noise. Further, the receiver 200 includes a synthesizer 215. The synthesizer can be a local oscillator. In an embodiment, the noise signal $I_s$ can be modeled as being injected due to fluctuations in a power supply of the receiver 200, or may have its origins in another noise source that is possibly radiatively coupled or coupled via the ground plane. The frequency of the fluctuations is related to the duty cycles of the wireless standards supported by the chip and is typically in the hundreds of Hertz, that is, in the audible range. Further, the receiver 200 also includes a mixer 220 operable to receive an amplified signal from the LNA 210 and another signal from the synthesizer 215. The amplified signal is obtained by amplifying the received signal in the LNA 210. The mixer 220 multiplies both signals so as to remove the carrier component and provide a baseband stereo signal. Examples of the mixer 220 include, but are not limited to, Gilbert cell mixers, diode mixers, diode ring mixers (ring modulation) and switching mixers.

Further, the receiver 200 includes a variable gain amplifier (VGA) 225. The VGA 225 or voltage-controlled amplifier is an electronic amplifier that varies its gain depending on a control voltage (often abbreviated CV). An analog to digital converter (ADC) 230 coupled to the VGA 225 for converting an analog signal into its digital representation. Examples of the ADC 230 include a ramp-compare ADC, integrating ADC, successive-approximation ADC and delta-encoded ADC.

A frequency demodulator 235 is coupled to the ADC 230 for extracting the original information-bearing signal from a modulated signal. In an embodiment, the frequency demodulator 235 is a phase-locked-loop (PLL). The signal is fed into a PLL and the error signal is used as the demodulated signal. In some embodiments, one or more units can be coupled between the ADC 230 and the frequency demodulator 235 such as filters or amplifiers.

Further, the receiver 200 includes a programmable delay 240 coupled to the frequency demodulator 235. The programmable delay 240 selectively adjusts time delay in order to optimize one or more performance criteria. The one or more performance criteria may be signal-to-noise ratio or spur-free dynamic range.

A stereo decoder 245 is coupled to the programmable delay 240 operable to receive a time delayed signal. The stereo decoder 245 transmits the time delayed signal in two channels, for example a first channel and a second channel. In an embodiment, the stereo decoder 245 can include gain amplifiers (248a and 248b) to amplify the time delayed signal in both channels with a gain $G_D$, the term $G_D$ being a multiplicative combination of a positive gain, $|G_D|$, and of a polarity, i.e., sign, of $G_D$. In some embodiments, the time delayed signal can include two separate channels or a combination and difference of two channels. For example, the two channels can correspond to two speakers of a stereo receiver and the combination of two channels corresponds to a single speaker of a mono receiver. The receiver 200 includes a plurality of digital to analog converters (DAC). For example, a first DAC 250a coupled to the stereo decoder 245 for receiving the time delayed signal in the first channel and a first DAC 250b coupled to the stereo decoder 245 for receiving the time delayed signal in the second channel. The plurality of DACs converts the digital representation of the time delayed signal in respective channels to analog signals. Examples of the DACs include, but are not limited to, pulse-width modulator, binary-weighted DAC and R-2R ladder DAC. The receiver 200 also includes a gain amplifier 255a coupled to the DAC 250a and a gain amplifier 255b coupled to the DAC 250b to amplify the analog signals. A noise signal $I_A$ is introduced at the input of the gain amplifier 255a and the gain amplifier 255b. The noise signal $I_A$ may have its origins in a noise source such as a fluctuating power supply, and it may be coupled either radiatively or via the ground plane. The analog signals after amplification are output by the receiver 200. In an embodiment, the receiver 200 includes plurality of speakers to output the analog signals in separate channels.

In an embodiment, the receiver 200 receives a signal L(t) through the antenna 205. The signal is L(t) is amplified using the LNA 210. Using the LNA 210, the effect of noise from subsequent stages of the receiver 200 is also reduced by the up-front gain of the LNA 210. After amplification by the LNA 210, the signal L(t) is fed to the mixer 220. The mixer 220 is operable to receive the signal L(t) from the LNA and a sinusoidal signal with frequency close to the carrier frequency of L(t), and produce as output an intermediate-frequency signal. The sinusoidal signal with frequency close to the carrier frequency of L(t) is generated by the synthesizer 215. However, due to fluctuations in the power supply, a noise $I_s$ is fed to the mixer 220. The intermediate-frequency signal generated by the mixer is then amplified using the VGA 225. The amplified composite signal is then converted to its digital representation using the ADC 230. The frequency demodulator 235 recovers the information-bearing audio-band signal from the digitized-and-amplified intermediate signal generated by the mixer. Audio samples derived from the frequency demodulator 235 are fed using the programmable delay. Initially, the time delay (τ), audio gain $G_A$, and audio volume $G_V$ are set to predetermined minimum values. The audio volume is a product of the audio gain $G_A$ and stereo decoder gain $G_D$. Each of the parameters τ, $G_A$ and $G_D$ have maximum, minimum and incremental values that are partly a design choice and partly determined by the dimensions of the receiver 200. Signal polarity of the audio samples is set to a first value and a signal-to-noise metric of the receiver is measured. Examples of the signal-to-noise metric include one of signal-to-noise ratio (SNR) or spur-free dynamic range (SFDR). The time delay (τ), the audio gain $G_A$, the stereo decoder gain $G_D$ and the signal polarity are modified till best values for the parameters are obtained for which the signal-to-noise metric is desired. Upon maximizing the signal-to-noise metric, best values of the parameters are set. The modified time delay is set by the programmable delay 240, the stereo decoder 245 is set with a modified stereo decoder gain and the gain amplifiers (255a and 255b) are set with a modified audio gain. The audio is time delayed using the programmable delay 240 and fed to the stereo decoder 245. Steps for adjusting the time delay, signal polarity, audio gain, and audio volume are illustrated in FIG. 3.

The stereo decoder 245 transmits the time delayed audio samples in the two channels. The time delayed audio samples are amplified with the gain $G_D$. Further, the audio samples in the two channels are converted to analog signals using the DACs (250a and 250b). The analog signals across the two channels are then fed to the gain amplifiers (255a and 255b). Additionally, the noise signal $I_A$ is introduced due to fluctuations in the power supply of the receiver 200 at the input of the gain amplifier 255a and the gain amplifier 255b. The analog signals and the noise signal are amplified with the gain $G_A$. The analog signals at the output of the gain amplifier 255a and the gain amplifier 255b are represented as follows:

$$L_{Rout}(t) = G_V R(t-\tau) + \{G_A I_A(t) \pm G_V I_S(t-\tau)\} \quad (3)$$

$$L_{Lout}(t) = G_V L(t-\tau) + \{G_A I_A(t) \pm G_V I_S(t-\tau)\} \quad (4)$$

Where, $(G_V = G_A |G_D|)$.

By modifying the time delay (τ), the audio gain $G_A$ and the stereo decoder gain $G_D$, the noise component $\{G_A I_A(t)$ $\pm G_r I_S(t-\tau)\}$ in equation (3) and (4) can be minimized, thus improving the signal to noise ratio (SNR) metric of the output of the receiver 200.

A method for reducing noise in transceiver is shown in FIG. 3.

At step 305, an adjustable time delay, signal polarity, and a plurality of audio gains are introduced in a first section of a signal path and a second section of the signal path into which noise may be introduced.

In one embodiment, the first section of the signal path includes an analog audio amplifier in a transmitter in the transceiver and the second section of the signal path comprises an up-converting synthesizer in the transmitter. The first section of the signal path includes an analog-to-digital converter and a stereo generator. The time delay is introduced between the stereo generator and the up-converting synthesizer.

In a second embodiment, the first section of the signal path includes an analog RF circuit in a receiver in the transceiver and the second section of the signal path comprises an analog audio circuit in the receiver. The signal path between the first and second sections includes an analog-to-digital converter, a demodulator, a stereo decoder, and a digital-to-analog converter.

For a transmitter section of the transceiver, the time delay is set to a predetermined minimum value and the signal polarity is set to a first value. The time delay can be maximum, minimum and incremental values that are partly a design choice and partly determined by the dimensions of the transmitter. The signal polarity can be one of a positive or negative polarity.

For a receiver section of the transceiver, the audio gain, the audio volume, the time delay of the receiver to predetermined initial values. The stereo decoder gain is set to equal to the quotient of the audio volume and the audio gain and the signal polarity is set to a first value. The time delay, audio gain and the audio volume can be maximum, minimum and incremental values that are partly a design choice and partly determined by the dimensions of the receiver. The signal polarity can be one of a positive or negative polarity.

At step 310, a signal to noise (SNR) metric is measured for the values set for time delay, the signal polarity and the plurality of audio gains.

At step 315, it is determined if the SNR metric measured is better than best recorded SNR metric.

For the transmitter section, if the signal-to-noise metric measured is better than any previously-measured signal-to-noise metric, the signal-to-noise metric and the values of the time delay and signal polarity is recorded as best-so-far.

For the receiver section, if the signal-to-noise metric is better than any previously-measured signal-to-noise metric, the signal-to-noise metric and the settings of the time delay, the audio gain, the audio volume, and the signal polarity is recorded as best-so-far.

Further, if the SNR metric measured is better than the best recorded SNR metric for the transmitter and the receiver section respectively, then step 320 is performed else step 325 is performed.

At step 320, values of the time delay, the signal polarity and the plurality of audio gains that achieve best SNR metric are noted.

At step 325, at least one of the time delay, the signal polarity, and a plurality of audio gains is selectively adjusted at a given audio volume, in order to improve a signal-to-noise metric of the transceiver.

For the transmitter section, the signal polarity is set to a second value and the signal-to-noise metric is again measured by performing step 310. If the signal-to-noise metric measured is better than any previously-recorded signal-to-noise metric, the signal-to-noise metric and the values of the time delay and signal polarity is recorded as best-so-far. Further, the value of the signal delay is incremented till a predetermined maximum value and the signal-to-noise metric is measured for both signal polarities till a final best recorded signal-to-noise metric is measured. After fixing the time delay and signal polarity in the receiver to the best-so-far values, the noise introduced due to the power supply in the transmitter section is reduced. In some embodiments, the plurality of audio gains such as the audio volume and the audio gain can be adjusted for the transmitter section to obtain best signal-to-noise metric and to reduce the noise in the transmitter section.

For the receiver section, the signal polarity is then set to a second value and the signal-to-noise metric of the receiver 200 is again measured by performing step 310. Then, if the signal-to-noise metric is better than any previously-recorded signal-to-noise metric, the signal-to-noise metric and the settings of the time delay, the audio gain, the audio volume, and the signal polarity is recorded as best-so-far. Further, the value of the signal delay is incremented till a predetermined maximum value and the signal-to-noise metric is measured for both signal polarities. Furthermore, the value of the audio gain is incremented till a predetermined maximum value, the time delay and the signal-to-noise metric is measured for each value. Further, the value of the audio volume is incremented till a predetermined maximum value, the time delay, the audio gain and the signal-to-noise metric is measured for each value till a final best recorded signal-to-noise metric is measured. After fixing the audio gain, audio volume, time delay and signal polarity in the receiver to the best-so-far values, the noise introduced due to the power supply in the receiver section is reduced.

The receiver disclosed in present disclosure improves signal-to-noise ratio and spur-free dynamic range at the FM receiver respectively by 1 dB and 3 dB when the FM receiver operates in tandem with another wireless system such as Bluetooth. Similarly, the transmitter disclosed in present disclosure improves signal-to-noise ratio and spur-free dynamic range at the FM transmitter respectively. In addition, the perceptive quality of the signal as assessed has improved considerably. Further, the programmable delay introduced in the present disclosure improves the passive interference cancellation.

In the foregoing discussion, each of the terms "coupled" and "connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:
1. A transceiver comprising:
 a transmitter having a transmitter signal path with a first section into which noise may be introduced and a second section into which noise may be introduced;

a programmable transmitter time delay circuit between the first and second sections of the transmitter signal path;

a programmable transmitter signal polarity reversing circuit between the first and second sections of the transmitter signal path;

a receiver having a receiver signal path with a first section into which noise may be introduced and a second section into which noise may be introduced;

a programmable receiver time delay circuit between the first and second sections of the receiver signal path;

a programmable receiver signal polarity reversing circuit between the first and second sections of the receiver signal path;

a programmable audio gain control between the first and second sections of the receiver signal path; and a programmable audio volume control between the first and second sections of the receiver signal path.

2. The transceiver of claim 1 including a system on a semiconductor chip that supports multiple wireless standards and in which the transceiver is integrated on the semiconductor chip.

3. A process of reducing noise in a transceiver comprising:
(a) setting a time delay to a first value and setting a signal polarity to a first value in a signal between a first section of a signal path into which noise may be introduced and a second section of the signal path into which noise may be introduced;
(b) measuring a first signal-to-noise metric of the transceiver;
(c) if the first signal-to-noise metric is better than any previously-measured signal-to-noise metric, then:
  (i) recording the first signal-to-noise metric, the first value of the time delay, and the first value of the signal polarity as best-so-far; and
  (ii) selectively adjusting at least one of the time delay to a second value, and the signal polarity to a second value; and
  (iii) measuring a second signal-to-noise metric of the transceiver;
(d) if the first signal-to-noise metric is not better than any previously-measured signal-to-noise metric:
  (i) selectively adjusting at least one of the time delay to a second value, and the signal polarity to a second value; and
  (ii) measuring a second signal-to-noise metric of the transceiver; and
(e) repeating the selectively adjusting at least one of the time delay value and the signal polarity until a best-so-far signal-to-noise metric is recorded.

4. The process of claim 3 including selectively adjusting a delay time, a signal polarity, a receiver audio gain, and an audio volume of a receiver portion of the transceiver until a best-so-far signal-to-noise metric is recorded.

5. The process of claim 3 including fixing the time delay value and the signal polarity to best-so-far values.

* * * * *